United States Patent
Murphy et al.

(10) Patent No.: US 7,964,238 B2
(45) Date of Patent: *Jun. 21, 2011

(54) METHOD OF MAKING COATED ARTICLE INCLUDING ION BEAM TREATMENT OF METAL OXIDE PROTECTIVE FILM

(75) Inventors: Nestor P. Murphy, West Bloomfield, MI (US); Maximo Frati, Ann Arbor, MI (US); Rudolph Hugo Petrmichl, Ann Arbor, MI (US); Jiangping Wang, Novi, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 791 days.

This patent is subject to a terminal disclaimer.

(21) Appl. No.: 11/984,542

(22) Filed: Nov. 19, 2007

(65) Prior Publication Data

US 2008/0199702 A1 Aug. 21, 2008

Related U.S. Application Data

(63) Continuation-in-part of application No. 11/699,080, filed on Jan. 29, 2007, now Pat. No. 7,833,574, which is a continuation-in-part of application No. 11/798,920, filed on May 17, 2007.

(51) Int. Cl.
*B05D 5/06* (2006.01)
*C23C 16/26* (2006.01)

(52) U.S. Cl. ............... 427/165; 427/166; 427/249.7; 427/255.33; 427/255.7; 427/529; 427/533; 427/376.2; 427/154; 204/192.1

(58) Field of Classification Search ............ 427/165, 427/166, 249.7, 255.31, 255.7, 533, 337, 427/343, 154, 255.33, 529, 376.2; 204/192.1
See application file for complete search history.

(56) References Cited

U.S. PATENT DOCUMENTS

| | | | |
|---|---|---|---|
| 5,073,450 A | 12/1991 | Nietering | |
| 6,312,808 B1 | 11/2001 | Veerasamy et al. | |
| 6,827,977 B2 * | 12/2004 | Veerasamy | 427/249.7 |
| 7,052,585 B2 | 5/2006 | Veerasamy et al. | |
| 7,060,322 B2 | 6/2006 | Veerasamy | |
| 7,067,175 B2 * | 6/2006 | Veerasamy | 427/249.7 |
| 7,150,849 B2 | 12/2006 | Veerasamy | |

(Continued)

OTHER PUBLICATIONS

"Hybrid AC EL Structures with Thin Protective ZnO Film", Tsvetkova et al., Journal of Physics: Conference Series 113 (2008) pp. 1-4.

(Continued)

*Primary Examiner* — Bret Chen
(74) *Attorney, Agent, or Firm* — Nixon & Vanderhye P.C.

(57) ABSTRACT

A method of making a heat treated (HT) coated article to be used in shower door applications, window applications, or any other suitable applications where transparent coated articles are desired. For example, certain embodiments of this invention relate to a method of making a coated article including a step of heat treating a glass substrate coated with at least a layer of or including diamond-like carbon (DLC) and an overlying protective film (e.g., of or including zinc oxide) thereon. In certain example embodiments, the protective film may be ion beam treated with at least carbon ions. It has been found that the ion beam treatment improves the shelf-life of the product prior to HT. Following and/or during heat treatment (e.g., thermal tempering, or the like), the protective film may be removed.

25 Claims, 4 Drawing Sheets

U.S. PATENT DOCUMENTS

| | | | |
|---|---|---|---|
| 7,229,900 B2 * | 6/2007 | Takayama et al. | 438/458 |
| 7,507,442 B2 | 3/2009 | Veerasamy | |
| 7,622,161 B2 | 11/2009 | Veerasamy | |
| 7,645,487 B2 * | 1/2010 | Petrmichl et al. | 427/372.2 |
| 7,833,574 B2 * | 11/2010 | Murphy et al. | 427/165 |
| 2003/0118860 A1 | 6/2003 | O'Shaughnessy et al. | |
| 2004/0258890 A1 | 12/2004 | Miller et al. | |
| 2005/0048284 A1 | 3/2005 | Veerasamy | |
| 2005/0095431 A1 | 5/2005 | Veerasamy | |
| 2005/0258029 A1 | 11/2005 | Muller et al. | |
| 2005/0287309 A1 | 12/2005 | Veerasamy | |
| 2006/0008654 A1 | 1/2006 | Veerasamy | |
| 2006/0166009 A1 | 7/2006 | Veerasamy | |
| 2007/0042186 A1 | 2/2007 | Veerasamy | |
| 2007/0231553 A1 | 10/2007 | Hartig et al. | |
| 2008/0182032 A1 * | 7/2008 | Krasnov et al. | 427/523 |
| 2008/0182123 A1 | 7/2008 | Murphy et al. | |
| 2010/0021642 A1 * | 1/2010 | Sol | 427/372.2 |

OTHER PUBLICATIONS

"Feasibility Study of RF Sputtered ZnO Film for Surface Micromachining", Bhatt et al., Surface & Coatings Technology, 198 (2005) pp. 304-308.

"Low-Emissivity Coating of Amorphous Diamond-Like Carbon/Ag-Alloy Multilayer on Glass" Chiba et al., Applied Surface Science 246 (2005) pp. 48-51.

* cited by examiner

METHOD OF MAKING COATED ARTICLE INCLUDING ION BEAM TREATMENT OF METAL OXIDE PROTECTIVE FILM

This application is a continuation-in-part (CIP) of U.S. Ser. No. 11/699,080, filed Jan. 29, 2007 now U.S. Pat. No. 7,833,574, and a CIP of Ser. No. 11/798,920, filed May 17, 2007 now U.S. Pat. No. 7,833,574, the entire disclosures of which are hereby incorporated herein by reference.

Certain embodiments of this invention relate to a method of making a heat treated (HT) coated article to be used in shower door applications, window applications, tabletop applications, or any other suitable applications. For example, certain embodiments of this invention relate to a method of making a coated article including a step of heat treating a glass substrate coated with at least a layer comprising diamond-like carbon (DLC) and an overlying protective film thereon. In certain example embodiments, the protective film may include one or both of (a) an oxygen blocking or barrier layer, and (b) a release layer. In certain example embodiments, the protective film (e.g., of or including zinc oxide) is ion beam treated so as to implant carbon (C) ions therein in order to improve the coated article's resistance to corrosion (i.e., to lengthen shelf-life) prior to heat treatment. Following and/or during heat treatment (e.g., thermal tempering, or the like) the protective film may be entirely or partially removed. Other embodiments of this invention relate to the pre-HT coated article, or the post-HT coated article, or methods of making the same.

BACKGROUND OF THE INVENTION

Coated articles such as transparent shower doors and IG window units are often heat treated (HT), such as being thermally tempered, for safety and/or strengthening purposes. For example, coated glass substrates for use in shower door and/or window units are often heat treated at a high temperature(s) (e.g., at least about 580 degrees C., more typically from about 600-650 degrees C.) for purposes of tempering.

Diamond-like carbon (DLC) is sometimes known for its scratch resistant properties. For example, different types of DLC are discussed in the following U.S. Pat. Nos. 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and 5,470,661, all of which are hereby incorporated herein by reference.

It would sometimes be desirable to provide a window unit or other glass article with a protective coating including DLC in order to protect it from scratches and the like. Unfortunately, DLC tends to oxidize and burn off at temperatures of from approximately 380 to 400 degrees C., as the heat treatment is typically conducted in an atmosphere including oxygen. Thus, it will be appreciated that DLC as a protective overcoat cannot withstand heat treatments (HT) at the extremely high temperatures described above which are often required in the manufacture of vehicle windows, IG window units, glass table tops, and/or the like.

Accordingly, those skilled in the art will appreciate that a need in the art exists for a method of providing heat treated (HT) coated articles with a protective coating (one or more layers) comprising DLC. A need for corresponding coated articles, both heat treated and pre-HT, also exists.

In this respect, U.S. patent application Ser. No. 11/798,920 (hereby incorporated herein by reference) discloses a method of making a coated article including a step of heat treating a glass substrate coated with at least a layer comprising diamond-like carbon (DLC) and an overlying protective film of zinc oxide thereon. In certain example embodiments, the protective film may be of or include both (a) an oxygen blocking or barrier layer, and (b) a release layer. Following and/or during heat treatment (e.g., thermal tempering, or the like) the zinc oxide based protective film may be entirely or partially removed.

Unfortunately, the pre-HT shelf life and/or stability of the coated articles of Ser. No. 11/798,920 are limited. For example, it has been found that the zinc oxide based protective film is susceptible to corrosion prior to heat treatment (after heat treatment, the protective film is often gone). Samples stored in moderately humid environments start to tarnish (when viewed from the glass side) suggesting that over time moisture is penetrating the zinc oxide based protective film and reaching the DLC. Also, films of Ser. No. 11/798,920 as deposited are unable to pass the one hour in condensing high heat and high humidity (50 C./95 rH) testing environment.

Accordingly, it will be appreciated that there exists a need in the art to improve the shelf-life and/or stability of coated articles such as those of Ser. No. 11/798,920 so that they are less likely to tarnish prior to heat treatment (HT).

BRIEF SUMMARY OF EXAMPLES OF INVENTION

Certain example embodiments of this invention relate to a method of making a heat treated (HT) coated article to be used in shower door applications, window applications, tabletop applications, or any other suitable application. For example, certain embodiments of this invention relate to a method of making a coated article including a step of heat treating a glass substrate coated with at least a layer comprising diamond-like carbon (DLC) and an overlying protective film thereon. In certain optional example embodiments, the protective film may be of or include both (a) an oxygen blocking or barrier layer, and (b) a release layer. In certain example embodiments, the protective film (e.g., of or including zinc oxide) is ion beam treated so as to implant carbon (C) ions therein in order to improve the coated article's resistance to corrosion (i.e., to lengthen shelf-life) prior to heat treatment. Following and/or during heat treatment (e.g., thermal tempering, or the like) the protective film may be entirely or partially removed. Certain example embodiments of this invention relate to the pre-HT coated article, or the post-HT coated article, or methods of making the same.

In certain example embodiments of this invention, there is provided a method of making a heat treated coated article, the method comprising: providing a glass substrate; forming at least one layer comprising diamond-like carbon (DLC) on the glass substrate; forming a protective film comprising zinc oxide on the glass substrate over at least the layer comprising DLC, ion beam treating the protective film comprising zinc oxide with at least carbon ions; heat treating the glass substrate with the layer comprising DLC and the protective film thereon so that during the heat treating the protective film prevents significant burnoff of the layer comprising DLC, wherein the heat treating comprises heating the glass substrate to temperature(s) sufficient for thermal tempering, heat strengthening, and/or heat bending; and exposing the protective film to a release liquid and removing at least part of the protective film during and/or after said heat treating.

In other example embodiments of this invention, there is provided a method of making a heat treated coated article, the method comprising: providing a glass substrate; forming at least one layer comprising carbon on the glass substrate; forming a protective film comprising at least one metal oxide on the glass substrate over at least the layer comprising carbon; ion beam treating the protective film with at least carbon ions; heat treating the glass substrate with the layer comprising carbon and the protective film thereon so that during the heat treating the protective film prevents significant burnoff of the layer comprising carbon, wherein the heat treating comprises heating the glass substrate to temperature(s) sufficient for thermal tempering, heat strengthening, and/or heat bending.

In still further example embodiments of this invention, there is provided a coated article comprising: a glass substrate; a layer comprising diamond-like carbon (DLC) on the glass substrate; a protective film comprising zinc oxide on the glass substrate over at least the layer comprising DLC; a layer or layer portion comprising zinc oxycarbide provided at a surface portion of the protective film comprising zinc oxide, so that the protective film comprising zinc oxide is graded, continuously or discontinuously, with respect to carbon content so as to have more carbon at a location in the protective film further from the glass substrate than at a location in the protective film closer to the glass substrate.

In other example embodiments of this invention, there is provided a method of making a heat treated coated article, the method comprising: providing a glass substrate; forming at least one layer comprising diamond-like carbon (DLC) on the glass substrate; forming a protective film comprising zinc oxide on the glass substrate over at least the layer comprising DLC, wherein said protective film comprising zinc oxide is formed using at least one sputtering target comprising zinc that is sputtered in an atmosphere including at least carbon gas; heat treating the glass substrate with the layer comprising DLC and the protective film thereon so that during the heat treating the protective film prevents significant burnoff of the layer comprising DLC, wherein the heat treating comprises heating the glass substrate to temperature(s) sufficient for thermal tempering, heat strengthening, and/or heat bending; and exposing the protective film to a release liquid and removing at least part of the protective film during and/or after said heat treating. It is possible that ion beam treatment may not be needed in this embodiment.

DETAILED DESCRIPTION OF EXAMPLE EMBODIMENTS OF THE INVENTION

Figure 1:
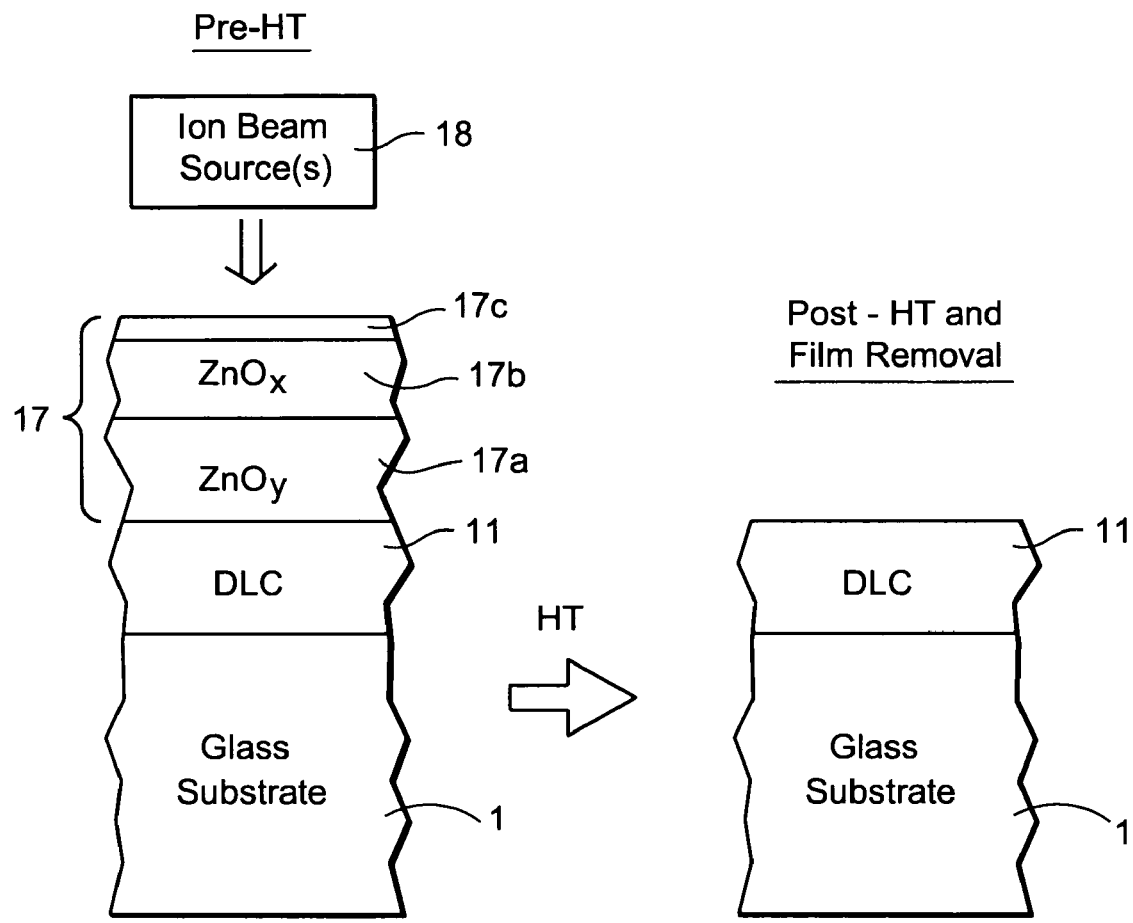
FIG. 1 is a schematic cross sectional view of a coated article, prior to and following heat treatment, according to an example embodiment of this invention.

Referring now more particularly to the accompanying drawings in which like reference numerals indicate like parts throughout the several views.

Certain example embodiments of this invention relate to methods of making coated articles that may use heat treatment (HT), wherein the coated article includes a coating (one or more layers) including diamond-like carbon (DLC). In certain instances, the HT may involve heating a supporting glass substrate, with the DLC thereon, to temperature(s) of from 550 to 800 degrees C., more preferably from 580 to 800 degrees C. (which is well above the burn-off temperature of DLC). In particular, certain example embodiments of this invention relate to a technique for allowing the DLC to withstand such HT without significantly burning off during the same. In certain embodiments, a sacrificial protective film (e.g., of or including one or more layers comprising zinc oxide, or the like) is formed on the glass substrate over the DLC so as to reduce the likelihood of the DLC burning off during HT. In certain example embodiments, the protective film (e.g., of or including zinc oxide) is ion beam treated so as to implant carbon (C) ions therein. It has surprisingly been found that this implantation of carbon in the protective film improves the coated article's resistance to corrosion (i.e., lengthens shelf-life) prior to heat treatment. Following and/or during heat treatment (e.g., thermal tempering, or the like) the protective film may be entirely or partially removed. Thus, the majority (if not all) of the DLC remains on the glass substrate, and does not burn off, during the HT. Following HT, the sacrificial protective film (which may include one or more layers) may or may not be removed in different embodiments of this invention.

In certain example embodiments, the sacrificial protective film may be of or include both (a) an oxygen blocking or barrier layer, and (b) a release layer. An example advantage of using distinct and different oxygen-blocking and release layers in film 17 is that each layer (17a and 17b) can be optimized for its intended function. Consequently, the optimized performance of the sacrificial film 17 may be improved and it can be made thinner if desired. The ion treatment of the protective film may cause a thin layer of or including zinc oxycarbide 17c to form at least in a surface area of the film 17. In certain example embodiments, following HT the DLC inclusive layer protects against abrasion and corrosion, and against adhesion of minerals in hard water (e.g., has good hard water cleanability). In alternatively example embodiments, the protective film 17 (e.g., of or including zinc oxide which may or may not be doped with Al or the like) may be a single layer which may or may not be oxidation graded.

FIG. 1 is a schematic cross sectional view of a coated article, before and after heat treatment, according to an example embodiment of this invention. Typically, the coated article on the left side of FIG. 1 exists during a stage of manufacture prior to heat treatment (HT), but may also exist post-HT in certain instances. The coated article shown in FIG. 1 includes glass substrate 1, DLC inclusive layer 11, and sacrificial protective film 17 which may include one or more layers. In certain example embodiments, the protective film 17 includes first and second layers 17a and 17b which may be of the same or different material(s), and includes zinc oxycarbide inclusive layer or layer portion 17c resulting from the ion beam treatment. Glass substrate 1 is typically of or includes soda-lime-silica glass, although other types of glass may be used in certain instances.

DLC inclusive layer 11 may be from about 5 to 1,000 angstroms (Å) thick in certain example embodiments of this invention, more preferably from 10-300 Å thick, and most preferably from 20 to 65 Å thick, possibly from about 25-50 Å thick, with an example thickness being about 30 angstroms. In certain example embodiments of this invention, DLC layer 11 may have an average hardness of at least about 10 GPa, more preferably at least about 20 GPa, and most preferably from about 20-90 GPa. Such hardness renders layer(s) 11 resistant to scratching, certain solvents, and/or the like. Layer 11 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC type or any other suitable type of DLC may include from 1 to 30% hydrogen, more preferably from 5-20% H, and most preferably from 10-20% H. This t-aC type of DLC includes more $sp^3$ carbon-carbon (C—C) bonds than $sp^2$ carbon-carbon (C—C) bonds. In certain example embodiments, at least about 30% or 50% of the carbon-carbon bonds in DLC layer 11 may be $sp^3$ carbon-carbon (C—C) bonds, more preferably at least about 60% of the carbon-carbon bonds in the layer 11 may be $sp^3$ carbon-carbon (C—C) bonds, and most preferably at least about 70% of the carbon-carbon bonds in the layer 11 may be $sp^3$ carbon-carbon (C—C) bonds. In certain example embodiments of this invention, the DLC may have an average density of at least about 2.4 gm/cm$^3$, more preferably at least about 2.7 gm/cm$^3$. Example linear ion beam sources that may be used to deposit DLC inclusive layer 11 on substrate 1 include any of those in any of U.S. Pat. Nos. 6,261,693, 6,002,208, 6,335,086, or 6,303,225 (all incorporated herein by reference). When using an ion beam source to deposit layer(s) 11, hydrocarbon feedstock gas(es) (e.g., $C_2H_2$), HMDSO, or any other suitable gas, may be used in the ion beam source in order to cause the source to emit an ion beam toward substrate 1 for forming layer(s) 11. It is noted that the hardness and/or density of layer(s) 11 may be adjusted by varying the ion energy of the depositing apparatus.

DLC layer 11 allows the coated article to be more scratch resistant than if the DLC 11 were not provided. It is noted that while layer 11 is on glass substrate 1 in certain embodiments of this invention, additional layer(s) may or may not be under layer II between the substrate 1 and layer 11 in certain example embodiments of this invention. Thus, the phrase "on the substrate" as used herein is not limited to being in direct contact with the substrate as other layer(s) may still be provided therebetween.

For example and without limitation, the layer 11 of or including DLC may be any of the DLC inclusive layers of any of U.S. Pat. Nos. 6,592,993; 6,592,992; 6,531,182; 6,461, 731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; or 5,470,661 (all of these patents hereby being incorporated herein by reference), or alternatively may be any other suitable type of DLC inclusive layer. DLC inclusive layer 11 may be hydrophobic (high contact angle), hydrophilic (low contact angle), or neither, in different embodiments of this invention. The DLC 11 may or may not include from about 5-30% Si, more preferably from about 5-25% Si, and possibly from about 10-20% Si in certain example embodiments of this invention. Hydrogen may also be provided in the DLC in certain instances.

Sacrificial protective film 17 is provided in order to protect DLC layer 11 during HT. If film 17 were not provided, the DLC 11 would significantly oxidize during HT and burn off, thereby rendering the final product defenseless against scratching. However, the presence of sacrificial protective film 17 prevents or reduces the amount of oxygen which can reach the DLC 11 during HT from the surrounding atmosphere, thereby preventing the DLC from significantly oxidizing during HT. As a result, after HT, the DLC inclusive layer 11 remains on the glass substrate 1 in order to provide scratch resistance and/or the like. In certain example embodiments, the protective film 17 includes both an oxygen blocking or barrier layer 17a, and a release layer 17b.

It has surprisingly been found that the use zinc and/or zinc oxide in sacrificial protective film 17 is/are especially beneficial with respect to reducing and/or preventing oxygen diffusion into the DLC during HT. In the FIG. 1 example embodiment of this invention, the protective film 17 includes a first zinc inclusive layer 17a and a second zinc oxide inclusive layer 17b. The first zinc inclusive layer 17a may be metallic, substantially metallic, or substoichiometric zinc oxide in different example embodiments of this invention; whereas the second zinc oxide inclusive layer 17b may be of or including zinc oxide in certain example embodiments of this invention. In certain example embodiments, layer 17a is more metallic than layer 17b. In other words, layer 17b contains more oxygen than does layer 17a. Thus, layer 17a is able to function is as a release layer whereas layer 17b is able to function as an oxygen blocking or barrier layer, along with zinc oxycarbide inclusive layer 17c. An oxygen "blocking" or "barrier" layer means that the layer blocks significant amounts of oxygen from reaching the DLC during HT.

In certain example embodiments of this invention, layer 17a may be of or include $ZnO_y$, and layer 17b may be of or include $ZnO_x$, where x>y (i.e., layer 17b contains more oxygen than layer 17a). Moreover, in certain example embodiments of this invention, y is from about 0 to 0.9, more preferably from about 0.1 to 0.9, even more preferably from about 0.1 to 0.8, and possibly from about 0.1 to 0.7. Meanwhile, in certain example embodiments of this invention, x is greater than y, and x is from about 0.3 to 1.0, more preferably from about 0.3 to 0.99, even more preferably from about 0.5 to 0.95, and possibly from about 0.6 to 0.90. Thus, it will be appreciated that in certain example instances, both layers 17a and 17b may be of or include zinc oxide, and both layers 17a and 17b may be substoichiometric.

Advantageously, it has been found that the use of zinc oxide layer 17a that is more metallic than zinc oxide layer 17b (in which 17c is formed) surprisingly permits more efficient and easier removal of the protective film 17 during and/or following heat treatment (HT). In other words, layer 17a is a release layer. The different compositions of zinc oxide inclusive layers 17a and 17b is used to cause different stresses in layers 17a and 17b, which stresses are manipulated so as to allow the film 17 to be more easily removed during and/or following HT. In particular, more metallic zinc oxide based layer 17a may be considered a release layer for allowing the film 17 to be easily removed from the DLC or substrate during and/or after HT due to its reduced or no oxygen content, whereas the less metallic (and more oxided) zinc oxide based layer 17b may be considered an oxygen blocking or barrier layer that reduces or prevents the DLC from burning off and/or oxidizing during HT. Zinc oxide is an advantageous material for film 17 because it can be easily removed (e.g., using water and/or vinegar) during and/or following HT in a non-toxic manner.

As noted above, one or both of layers 17a and 17b when of or including zinc and/or zinc oxide may be substoichiometric. This is advantageous for oxygen gettering purposes during HT. If the zinc oxide of the entire film 17 is too oxided (i.e., fully stoichiometric) prior to HT, then oxygen can diffuse through the zinc oxide. However, the substoichiometric nature of layer(s) 17a and/or 17b permits the zinc therein to getter oxygen during HT, so that at least layer 17a (and possibly layer 17b) does not burn off during HT. It is noted that upper zinc oxide based layer 17b and/or zinc oxycarbide (or zinc aluminum oxycarbide 17c) may or may not burn off (entirely or partially) during HT in different example embodiments of this invention. It is noted that another example advantage of substoichiometric zinc oxide (compared to fully stoichiometric zinc oxide) is that it can be deposited (e.g., via sputtering or the like) more quickly. One or both of layers 17a, 17b may be sputter-deposited in a substoichiometric form, in any suitable manner; e.g., by varying oxygen gas flow in the sputtering chamber(s). For example, as one non-limiting example, layer 17a may be sputter-deposited using 10 ml/kW (regarding content of oxygen gas flow), whereas layer 17b may be sputter-deposited using 12 ml/kW (with remainder of the gas being Ar or the like) in example instances.

Note that one or more of zinc oxide inclusive layers 17a, 17b and 17c may be doped with other materials such as Al, N, Zr, Ni, Fe, Cr, Ti, Mg, mixtures thereof, or the like, in certain example embodiments of this invention.

In certain example embodiments of this invention, release layer 17a (e.g., of zinc or substoichiometric zinc oxide) may be deposited (e.g., via sputtering) so as to be from about 50-20,000 Å thick, more preferably from about 50-3,000 Å thick, even more preferably from about 100-1,000 Å thick, with an example thickness being from about 100-300 Å. In certain embodiments, zinc oxide inclusive layer 17b may be deposited (e.g., via sputtering) so as to be from about 200-10,000 Å thick, more preferably from about 500-5,000 Å thick, more preferably from about 1,000-3,000 Å thick, with an example thickness being about 2,000 Å. In certain example embodiments, the zinc oxycarbide or zinc aluminum oxycarbide inclusive layer or layer portion 17c may be at least about 50 Å thick in certain example embodiments (e.g., 50-500 Å thick), more preferably at least about 100 Å (e.g., 100-500 Å thick), 150 Å (e.g., 150-400 Å thick), or 200 Å thick (e.g., 200-400 Å thick). More metallic layer 17a may be thicker than less metallic layer 17b (17b includes 17c in this respect) in certain example embodiments of this invention; layer 17a may be at least twice as thick as layer 17b in certain example instances prior to HT. A preferred thickness of overall sacrificial film 17 in certain example embodiments is less than about 10,000 Å, more preferably less than about 3,000 Å, and most preferably less than about 1,000 Å.

Figure 2:
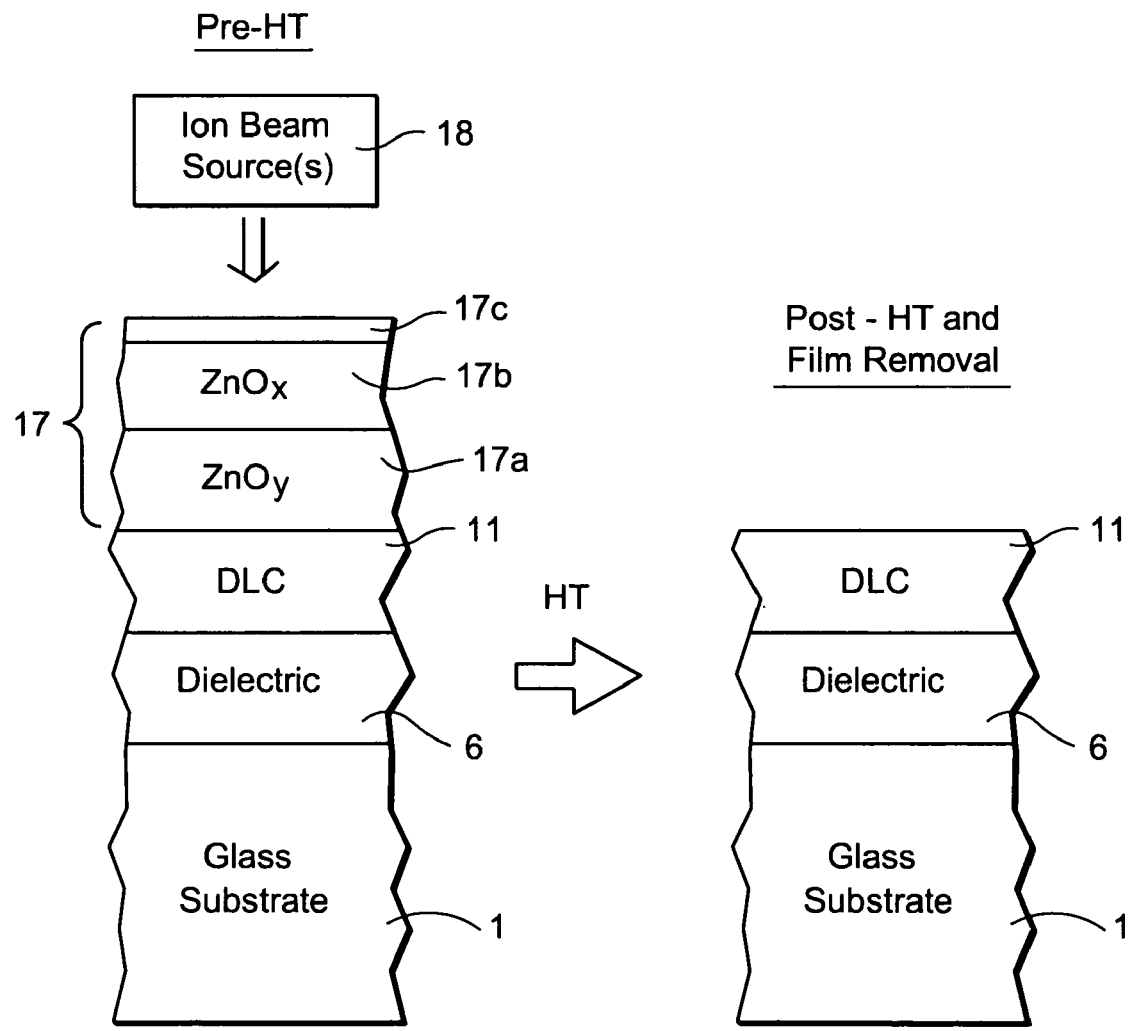
FIG. 2 is a schematic cross sectional view of a coated article, prior to and following heat treatment, according to another example embodiment of this invention.

FIG. 2 illustrates another example embodiment of this invention. The FIG. 2 embodiment is the same as the FIG. 1 embodiment discussed above, except that in the FIG. 2 embodiment a barrier layer 6 is provided between the glass substrate 1 and the DLC inclusive layer 11. Barrier layer 6 may be a dielectric in certain example embodiments of this invention. Optional barrier layer 6 is for preventing or reducing oxygen and/or sodium (Na) from migrating from the glass 1 into the DLC 11 during HT. In this respect, such an optional barrier layer 6 may improve the overall optical characteristics of the coated article post-HT. Barrier layer 6 may be of or include silicon oxide, silicon nitride, silicon oxynitride, and/or the like, although other barrier materials may also be used. Barrier layer(s) 6 is formed on the glass substrate 1 via sputtering, or via any other suitable technique. Barrier layer 6 may be from about 10 to 1,000 Å thick in certain example embodiments, more preferably from 50 to 500 Å thick, and most preferably from 50 to 200 Å thick. It is noted that a barrier layer(s) 6 may also be provided in other example embodiments of this invention, for instance in any of FIGS. 4-7 if desired between the DLC 11 and the glass substrate 1.

Figure 3:
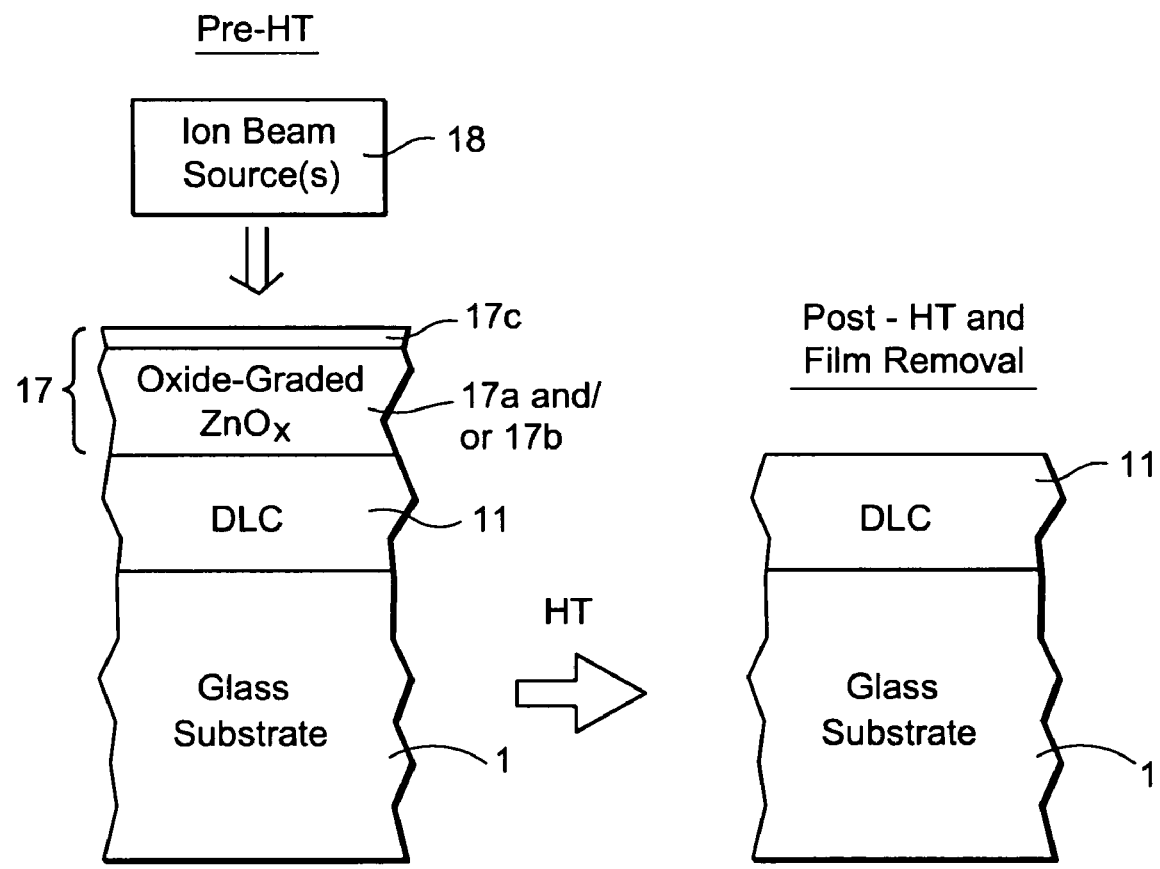
FIG. 3 is a schematic cross sectional view of a coated article, prior to and following heat treatment, according to another example embodiment of this invention.

FIG. 3 illustrates another example embodiment of this invention. The FIG. 3 embodiment is the same as the FIG. 1 embodiment (or even the FIG. 2 embodiment if barrier layer 6 is used, which may be the case in the FIG. 3 embodiment), except that instead of two discrete layers 17a and 17b the protective film 17 is made of one layer that is oxidation graded (continuously or non-continuously) through its thickness. In the FIG. 3 embodiment, the film 17 is provided in a manner so that the film 17 includes more oxygen at a location further from the DLC layer 11 than at another location in the film closer to the DLC layer 11. Note that the film 17 in the FIG. 1-2 embodiments may also be considered oxidation graded because the overall film 17 is more oxided in layer 17b further from the DLC 11 than in layer 17a closer to the DLC 11. However, in the FIG. 3 embodiment, it is also possible for continuous or substantially continuous oxidation grading to occur through the entire or substantially entire film 17 in certain example instances.

In each of the embodiments of FIGS. 1-3, the protective film 17 (e.g., of or including zinc oxide) may be ion beam treated so as to implant at least carbon (C) into the film 17, at least in a surface area thereof. It has surprisingly been found that this implantation of carbon in the protective film improves the coated article's resistance to corrosion (i.e., lengthens shelf-life) prior to heat treatment. The ion beam treatment may be performed use one or more ion sources 18. Gas such as acetylene ($C_2H_2$), carbon dioxide, or the like may be used in the ion source(s) 18 during such ion beam treatment in order to cause carbon ions to be directed toward and into film 17. In certain example embodiments, the carbon may be implanted up to at least about 50 Å beneath the surface of film 17, more preferably up to at least about 100 Å, 150 Å, or 200 Å beneath the surface of film 17. The ion beam treatment causes at least some zinc oxycarbide to form at least at a surface area of film 17. Thus, the zinc oxycarbide inclusive layer 17c may be at least about 50 Å thick in certain example embodiments, more preferably at least about 100 Å, 150 Å, or 200 Å thick. Because zinc oxycarbide is tightly adherent and relatively insoluble, the film 17 becomes more resistant to corrosion and more durable thereby extending its pre-HT shelf life. It has been found that samples treated using carbon dioxide have improved shelf life compared with samples deposited using only oxygen.

In different embodiments of this invention, the ion beam treatment of film 17 may be performed: (a) after the film 17 has been sputter-deposited, and/or (b) while the film 17 is being sputter-deposited. The former case may be referred to as peening, while the latter case may be referred to as ion beam assisted deposition (IBAD) in certain example instances. IBAD type ion beam treatment is performed simultaneously with sputtering, so that the ion beam is being used to treat film 17 as it is being sputter-deposited.

Example ion beam treating according to a peening type (a) of ion beam treatment for film 17 may be described as follows. A film 17 (including one or both of 17a, 17b) (e.g., $ZnO_x$) is deposited by sputtering on the glass substrate 1. The sputtered zinc oxide of film 17 may or may not be doped with other elements (e.g., Al) in different embodiments of this invention. After the $ZnO_x$ inclusive film 17 has been sputtered onto substrate 1 over DLC 11, the coated article is moved relative to at least one ion source 18 so as to be in a position for sputtering. At least one gas including carbon (e.g., a hydrocarbon gas such as $C_2H_2$ or the like) is fed through or used in the ion source(s) 18 so that the ion source(s) causes an ion beam including at least carbon (C) ions to be emitted toward the $ZnO_x$ film 17. The C ions in the ion beam are provided with sufficient energy so that they can implant into the $ZnO_x$ inclusive film 17 as shown in FIGS. 1-3. It is noted that the ion beam from source 18 may be focused, diffused, or collimated in different embodiments of this invention.

The implantation of C ions/atoms into the sputtered $ZnO_x$ inclusive film 17 causes a layer comprising zinc oxycarbide 17c to be formed at least proximate the surface of the film as shown in FIGS. 1-3. This implantation of C ions/atoms into film 17 causes the resistance to corrosion of the resulting film 17 to significantly improve relative to that of a film 17 before the C ions/atoms were implanted.

When implanting into the $ZnO_x$ film 17, in certain example instances the carbon ions have sufficient ion energy so as to knock off oxygen (O) from $ZnO_x$ molecules so as to enable a substantially continuous layer or layer portion comprising zinc oxycarbide 17c to form near a surface of the previously sputtered layer as shown in FIGS. 1-3. In certain example embodiments, the zinc oxycarbide layer 17c may be characterized at least in part by $ZnO_xC_y$, where x/y is from 0.5 to 1.5.

A relatively high voltage is required in the ion source(s) 18 in order to provide sufficient energy for the carbon ions in the beam from the ion source to: (a) implant into the sputtered $ZnO_x$ film 17, (b) knock off oxygen from $ZnO_x$ molecules, and (c) carry out (a) and (b) to an extent sufficient so that a substantially continuous layer of zinc oxycarbide 17c can be formed. In order to achieve sufficient energy in this respect, according to certain example embodiments of this invention the ion source(s) 18 uses an anode-cathode voltage of at least about 800 V, more preferably at least about 1,500 V, even more preferably at least about 2,000V, and still more preferably at least about 2,500 V. Even a source voltage of at least about 3,500 V may be used in certain instances. The aforesaid "voltage" (or accelerating voltage) referred to which is used in the ion source(s) 18 to cause implantation of the C ions/atoms in film 17, is the voltage between the anode and the cathode of the ion source. As is known in the art, "ion energy" is related to this anode/cathode "voltage" but is different therefrom. The molecular fragment ion energy is one half ($\frac{1}{2}$) of the accelerating voltage for molecular acetylene ($C_2H_2$) for example. Thus, the molecular fragment ion energy, given a voltage of 2,000 V would be 2,000/2=1,000 V. Moreover, in the case of C ions formed from acetylene ($C_2H_2$) used as a feedstock gas in the ion source, there are two carbon atoms per molecular fragment. Thus, the energy per carbon ion is the molecular fragment ion energy divided by 2 in this case where $C_2H_2$ is used as the feedstock gas to form the C ions in the beam. In other words, for purposes of example only, in the case where the C ions are formed using $C_2H_2$ as the feedstock gas in the ion source, ion source voltages (i.e., at least about 800 V, 1,500 V, 2,000 V and/or 2,500 V as explained above) translate into ion energies of at least about 200 eV per C ion, more preferably at least about 375 eV per C ion, even more preferably at least about 500 eV per C ion, and still more preferably at least about 625 eV per C ion. If too low of an ion energy (or voltage in the ion source) is used, C ion implantation and/or formation of a continuous layer comprising titanium oxycarbide may not be achieved.

It will be recognized that when a hydrocarbon gas such as $C_2H_2$ is used as the feedstock gas in the source 18, the ions in the resulting beam will include both C ions and H ions. Thus, the zinc oxycarbide layer or layer portion 17c may be doped with H (in addition to Al or the like) in certain embodiments of this invention. In certain example embodiments, the layer 17c may include from 0 to 20% H, more preferably from about 1 to 18% H, and even more preferably from about 5 to 15% H.

In certain embodiments of this invention, C ions are implanted deep enough into the sputtered $ZnO_x$ film 17 so as to enable a substantially continuous layer comprising zinc oxycarbide 17c to form at least proximate a top portion thereof. In certain example embodiments, at least some C ions (and/or C atoms) are implanted into the sputtered film 17 to a depth "d" of at least 25 Å below the top surface of the sputtered film 17 (more preferably at least 50 Å, even more preferably at least 100 Å). Insufficient implantation may contribute to non-enhancement of durability, or the like, or very quick wearing off of the same.

In certain example embodiments of this invention, the ion source(s) 18 may be operated so as to only emit enough C ions toward film 17 so as to cause C ion/atom implantation in film 17 as shown in FIGS. 1-3, but not to cause a layer of amorphous DLC (e.g., ta-C or ta-C:H) to form over the zinc oxycarbide layer 17c. Alternatively, in other embodiments of this invention, the source(s) 18 is operated so as to cause a thin layer (not shown) comprising amorphous DLC (e.g., ta-C or ta-C:H) to form over the zinc oxycarbide layer 17c. Example characteristics of such DLC layers are discussed in U.S. Pat. No. 6,261,693, hereby incorporated herein by reference. This thin DLC layer (not shown) may be from about 1-30 Å thick in certain example embodiments, more preferably from about 1-20 Å thick. It is noted that other layers may also be provided over the oxycarbide in certain instances. Moreover, this very thin DLC inclusive layer may in certain embodiments be sacrificial in that it is designed so that it may wear away (i.e., disappear) over time, especially during HT. Thus, for example, such a thin layer comprising DLC may be used to protect the coated article from scratching or the like during shipping, process, or the like, and then wear off over time (or burn off during HT). Optionally, this overlying layer comprising DLC (not shown) may be even thicker than 30 Å in certain example instances. Such overlying DLC inclusive layer(s) herein may include a large amount of $sp^3$ carbon-carbon bonds (e.g., at least 40% of C—C bonds in the layer may be such bonds, more preferably at least 50%), may or may not be hydrogenated (e.g., from about 1-25% H, more preferably from about 3-18% H) or include other dopants in different embodiments of this invention, and/or may have a density of at least 2.4 gms/cm$^3$ in certain example instances.

Example ion sources 18 that may be used for ion beam treatment of film 17 are disclosed in U.S. Pat. Nos. 6,002,208, 7,052,585, and 2005/0258029, all of which are hereby incorporated herein by reference.

An example process of manufacturing a coated article will now be described, with reference to FIGS. 1-3. Initially, glass substrate 1 is provided, and at least one barrier layer 6 (e.g., silicon oxide, silicon nitride, silicon oxynitride, or the like) may optionally be sputtered on a surface thereof. Optionally, a multi-layer solar control coating (not shown) may be deposited (e.g., via sputtering) on the surface of the glass substrate 1 opposite the barrier layer 6. At least one layer 11 of or including DLC is deposited (e.g., via ion beam deposition) on the glass substrate 1, over at least the optional barrier layer 6 if present. Then, protective film 17, e.g., including one or more layers (e.g., of or including zinc oxide), is deposited on the substrate 1 over the DLC inclusive layer 11. Protective film 17 may be deposited via sputtering, CVD, ion beam deposition, or any other suitable technique. The protective film 17 is then ion beam treated with at least C ions as discussed above. Optionally, a thin protective layer comprising DLC, silicon nitride, aluminum nitride, or silicon aluminum nitride (not shown), may be provided over film 17 prior to HT in certain instances, for durability and/or oxygen barrier purposes. As shown in FIGS. 1-3, the glass substrate 1 with films 6 (optional), 11 and 17 thereon is then heat treated (HT) for purposes of thermal tempering, heat bending, heat strengthening, and/or the like. At least part of this HT may be conducted, for example, in an atmosphere including oxygen as known in the art at temperature(s) of from 550 to 800 degrees C., more preferably from 580 to 800 degrees C. (i.e., temperature(s) above the burn-off temperature of DLC). The HT may last for at least one minute, more preferably from 1-10 minutes, in certain example non-limiting embodiments of this invention. During HT, the presence of protective film 17 protects DLC inclusive layer 11 from the HT and prevents layer 11 from significantly oxidizing and/or burning off due to significant oxidation during the HT. While in some instances some of layer 11 may burn off during HT, the majority if not all of DLC inclusive layer 11 remains on the substrate 1 even after the HT due to the presence of protective film 17. However, the film 17 may be removed during and/or after HT. A significant advantage associated with using zinc and/or zinc oxide in film 17 is its ease of removal after HT. It has been found that when film 17 is made of zinc and/or zinc oxide, soluble in vinegar and/or water (possibly only water with no vinegar required in certain preferred embodiments), the application of vinegar and/or water allows portions of film 17 remaining after HT to be easily removed in a non-toxic manner. Again, in certain example embodiments, it is possible to remove the zinc oxide with only water (no vinegar needed) in certain instances, which is advantageous from a cost and processing point of view. In certain example instances, rubbing with such liquids may be especially beneficial in removing film 17 after HT when the coated article is still warm therefrom (e.g., when the film 17 is from about 80-200 degrees C., more preferably from about 100-180 degrees C.; although the removal of film 17 may also take place at room temperature in certain example embodiments). After film 17 has been removed, the remaining coated article is shown at the right side of FIGS. 1-3, and includes an outer layer comprising scratch resistant DLC. The aforesaid processes are advantageous in that they provide a technique for allowing a coated article including a protective DLC inclusive layer 11 to be heat treated without the DLC layer 11 burning off during such HT. In other words, it becomes possible to provide a protective DLC inclusive layer 11 on a heat treated (e.g., thermally tempered) product in a commercially acceptable manner.

Figure 4:
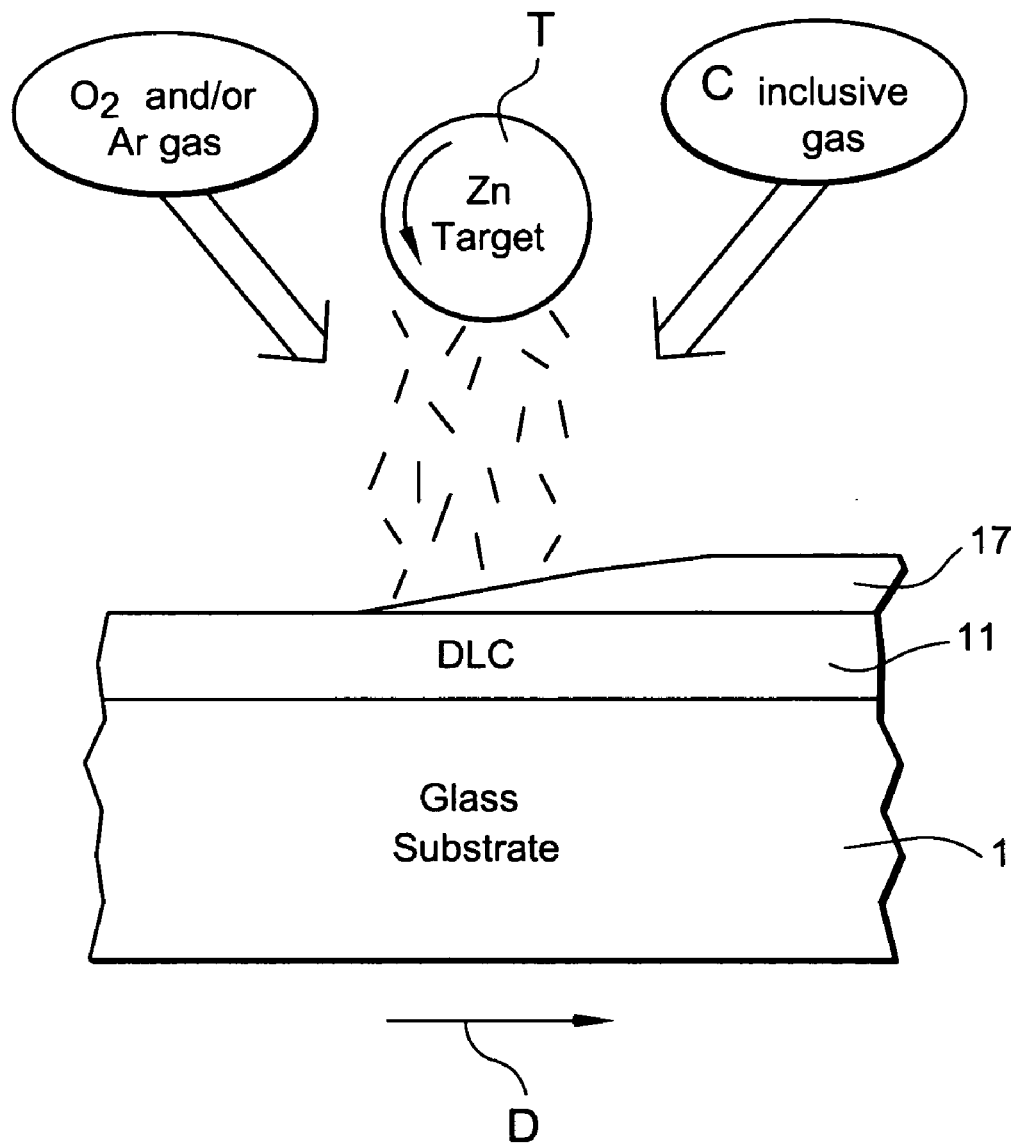
FIG. 4 is a schematic cross sectional view of a method of making a coated article according to another example embodiment of this invention.

FIG. 4 is a schematic cross sectional view of a method of making a coated article according to another example embodiment of this invention. No ion beam treating of the layer or film 17 is need in this embodiment, although ion beam treatment may be used to treat film 17 after it has been deposited in accordance with the FIG. 4 embodiment. In the FIG. 4 embodiment, one or more sputtering targets T (e.g., magnetron rotating targets) of or including Zn or $ZnO_x$ is/are used to sputter-deposit film 17 on the substrate 1 as the substrate moves in direction D, possibly over DLC 11. Film 17 may be of or include zinc oxide as in any of the embodiments discussed above with respect to FIGS. 1-3. In the FIG. 4 embodiment, carbon inclusive gas (e.g., one or more of carbon dioxide, acetylene, or the like) is introduced into the sputtering chamber(s) so that the target(s) T is/are sputtered in an atmosphere including the carbon inclusive gas and possibly other gas such as oxygen gas and/or argon gas in order to sputter-deposit zinc oxide inclusive film 17. Because of the carbon inclusive gas in the sputtering chamber, the zinc oxide inclusive film 17 is deposited in a manner so as to include carbon therein. In this embodiment, the carbon may be provided throughout the thickness of the film 17 (or a layer thereof) in a substantially constant manner in certain example embodiments.

It is also possible to deposit layer 17a using one or more sputtering targets T (e.g., magnetron rotating targets) of or including Zn or $ZnO_x$ in an atmosphere of oxygen and/or argon (no or little carbon), and then to deposit layer 17b using one or more sputtering targets T (e.g., magnetron rotating targets) of or including Zn or $ZnO_x$ in an atmosphere including carbon inclusive gas in addition to oxygen and/or argon as discussed above. In this respect, the film 17 would be graded, continuously or discontinuously, with respect to carbon content through the film.

The FIG. 4 embodiment is similar to the FIG. 1-3 embodiments in that the presence of carbon in the film 17 causes zinc oxycarbide to be formed in film 17 (throughout all or only part thereof, including at the top surface thereof). This zinc oxycarbide in film 17 causes the resistance to corrosion of the resulting film 17 to significantly improve relative to that of a zinc oxide film not including oxycarbide. After formation of the film 17 in the FIG. 4 embodiment, the coated article may be heat treated (HT), and the film 17 may be removed, as described above in connection with the FIG. 1-3 embodiments.

According to certain example embodiments of this invention, coated articles herein lose no more than about 15% of their visible transmission due to HT, more preferably no more than about 10%. Moreover, monolithic coated articles herein preferably have a visible transmission after HT of at least about 50%, more preferably of at least about 60 or 75%.

In certain example embodiments of this invention, Mg may replace or supplement the Zn in the protective film 17.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making a heat treated coated article, the method comprising:
providing a glass substrate;
forming at least one layer comprising diamond-like carbon (DLC) on the glass substrate;
forming a protective film comprising zinc oxide on the glass substrate over at least the layer comprising DLC,
ion beam treating the protective film comprising zinc oxide with at least carbon ions;
heat treating the glass substrate with the layer comprising DLC and the protective film thereon so that during the heat treating the protective film prevents significant burnoff of the layer comprising DLC, wherein the heat treating comprises heating the glass substrate to temperature(s) sufficient for thermal tempering, heat strengthening, and/or heat bending; and
exposing the protective film to a release liquid and removing at least part of the protective film during and/or after said heat treating.

2. The method of claim 1, wherein the ion beam treating forms a layer comprising zinc oxycarbide at least at a surface portion of the protective film.

3. The method of claim 1, wherein the protective film include a release layer and an oxygen barrier layer, the release layer and the oxygen barrier layer being of different material and/or different stoichiometry relative to each other; and wherein one or both of the release layer and oxygen barrier layer is subjected to the ion beam treating; and wherein the release layer comprises an oxide of one or more of boron, titanium boride, magnesium and/or zinc.

4. The method of claim 1, wherein the protective film comprises a release layer and an oxygen barrier layer, wherein the release layer and the oxygen barrier layer of the protective film both comprise zinc but are of different stoichiometries.

5. The method of claim 4, wherein, in the protective film, the release layer comprising zinc is more metallic than is the oxygen barrier layer comprising zinc oxide prior to the heat treating.

6. The method of claim 1, wherein the protective film comprising zinc oxide is oxidation graded in a continuous or non-continuous manner prior to the heat treating so that prior to the heat treating the layer is more oxided at a location further from the layer comprising DLC than at a location closer to the layer comprising DLC.

7. The method of claim 1, wherein the layer comprising DLC is formed via an ion beam(s).

8. The method of claim 1, wherein the protective film is at least partially formed via sputtering.

9. The method of claim 1, further comprising forming a barrier layer comprising silicon oxide and/or silicon nitride on the glass substrate so as to be located between at least the glass substrate and the layer comprising DLC.

10. The method of claim 1, wherein the heat treating comprises heating the glass substrate with the layer comprising DLC and the protective film thereon using at least temperature(s) of at least 550 degrees C.

11. The method of claim 1, wherein the layer comprising DLC comprises amorphous DLC and has more $sp^3$ carbon-carbon bonds than $sp^2$ carbon-carbon bonds.

12. The method of claim 1, wherein the layer comprising DLC has an average hardness of at least 10 GPa.

13. The method of claim 1, wherein the layer comprising DLC has an average hardness of at least 20 GPa.

14. The method of claim 1, wherein the layer comprising DLC has a density of at least about 2.7 $gm/cm^3$, and wherein the layer comprising DLC is hydrogenated.

15. The method of claim 1, wherein the coated article is substantially transparent and is used as a shower door.

16. The method of claim 1, wherein after said removing at least part of the layer comprising DLC is exposed so as to be an outermost layer of the coated article.

17. A method of making a heat treated coated article, the method comprising:
  providing a glass substrate;
  forming at least one layer comprising carbon on the glass substrate;
  forming a protective film comprising at least one metal oxide on the glass subkrate over at least the layer comprising carbon;
  ion beam treating the protective film with at least carbon ions;
  heat treating the glass substrate with the layer comprising carbon and the protective film thereon so that during the heat treating the protective film prevents significant burnoff of the layer comprising carbon, wherein the heat treating comprises heating the glass substrate to temperature(s) sufficient for thermal tempering, heat strengthening, and/or heat bending.

18. The method of claim 17, further comprising exposing the protective film to a release liquid and removing at least part of the protective film during and/or after said heat treating.

19. The method of claim 17, wherein the protective film comprises zinc oxide.

20. The method of claim 17, wherein the ion beam treating forms a layer comprising metal(s) oxycarbide at least at a surface portion of the protective film.

21. A method of making a heat treated coated article, the method comprising:
  providing a glass substrate;
  forming at least one layer comprising diamond-like carbon (DLC) on the glass substrate;
  forming a protective film comprising zinc oxide on the glass substrate over at least the layer comprising DLC, wherein said protective film comprising zinc oxide is formed using at least one sputtering target comprising zinc that is sputtered in an atmosphere including at least carbon gas;
  heat treating the glass substrate with the layer comprising DLC and the protective film thereon so that during the heat treating the protective film prevents significant burnoff of the layer comprising DLC, wherein the heat treating comprises heating the glass substrate to temperature(s) sufficient for thermal tempering, heat strengthening, and/or heat bending; and
  exposing the protective film to a release liquid and removing at least part of the protective film during and/or after said heat treating.

22. The method of claim 21, wherein the atmosphere in which the target is sputtered comprising carbon, oxygen and argon gas.

23. A method of making a heat treated coated article comprising: a glass substrate; at least one layer comprising diamond-like carbon (DLC) on the glass substrate; and a protective film comprising zinc oxide on the glass substrate over at least the layer comprising DLC, the method comprising:
  ion beam treating the protective film comprising zinc oxide with at least carbon ions;
  heat treating the glass substrate with the layer comprising DLC and the protective film thereon so that during the heat treating the protective film prevents significant burnoff of the layer comprising DLC, wherein the heat treating comprises heating the glass substrate to temperature(s) sufficient for thermal tempering, heat strengthening, and/or heat bending; and
  exposing the protective film to a release liquid and removing at least part of the protective film during and/or after said heat treating.

24. The method of claim 23, wherein the ion beam treating forms a layer comprising zinc oxycarbide at least at a surface portion of the protective film.

25. A method of making a heat treated coated article comprising: a glass substrate; at least one layer comprising diamond-like carbon (DLC) on the glass substrate; an ion beam treated protective film comprising zinc oxide and carbon on the glass substrate over at least the layer comprising DLC, the method comprising:
  heat treating the glass substrate with the layer comprising DLC and the ion beam treated protective film thereon so that during the heat treating the protective film prevents significant burnoff of the layer comprising DLC, wherein the heat treating comprises heating the glass substrate to temperature(s) sufficient for thermal tempering, heat strengthening, and/or heat bending; and
  exposing the protective film to a release liquid and removing at least part of the protective film during and/or after said heat treating.

* * * * *